(12) United States Patent
Kim

(10) Patent No.: US 7,365,564 B2
(45) Date of Patent: Apr. 29, 2008

(54) APPARATUS AND METHOD FOR CONTROLLING ON DIE TERMINATION

(75) Inventor: Kyung-Hoon Kim, Kyoungki-do (KR)

(73) Assignee: Hynix Semiconductor Inc., Kyoungki-Do (KR)

( * ) Notice: Subject to any disclaimer, the term of this patent is extended or adjusted under 35 U.S.C. 154(b) by 4 days.

(21) Appl. No.: 11/525,951

(22) Filed: Sep. 25, 2006

(65) Prior Publication Data

US 2007/0126470 A1 Jun. 7, 2007

(30) Foreign Application Priority Data

Sep. 29, 2005 (KR) .............. 10-2005-0090953
May 30, 2006 (KR) .............. 10-2006-0049027

(51) Int. Cl.
*H03K 19/003* (2006.01)

(52) U.S. Cl. .......................... 326/30; 326/28

(58) Field of Classification Search ............ 326/26–28, 326/30

See application file for complete search history.

(56) References Cited

U.S. PATENT DOCUMENTS

| 7,019,555 | B2 * | 3/2006 | Lee ............... 326/30 |
| 7,034,567 | B2 | 4/2006 | Jang |
| 7,196,966 | B2 * | 3/2007 | Jin ............... 365/233 |
| 2005/0180229 | A1 | 8/2005 | Jin |
| 2005/0268059 | A1 | 12/2005 | Laberge |
| 2007/0126468 | A1 * | 6/2007 | Kim ............... 326/30 |

FOREIGN PATENT DOCUMENTS

| JP | 2004-310981 | 11/2004 |
| JP | 2005-228458 | 8/2005 |
| KR | 2003-0083237 | 10/2003 |
| KR | 2003-0097441 | 12/2003 |
| KR | 2004-0062716 | 7/2004 |
| KR | 2005-0081315 | 8/2005 |
| KR | 10-2007-0002995 | 1/2007 |

\* cited by examiner

*Primary Examiner*—Rexford Barnie
*Assistant Examiner*—Christopher Lo
(74) *Attorney, Agent, or Firm*—McDermott Will & Emery LLP

(57) ABSTRACT

An apparatus for controlling an on die termination (ODT) includes a counting unit for receiving an external clock signal and a delay locked loop (DLL) clock signal, and counting the toggle number of each of external clock signal and the DLL clock signal from a preset number; a comparing control unit for comparing the counted toggle number of the external clock signal with that of the DLL clock signal in response to an ODT command signal, and outputting an ODT enable signal for controlling the ODT based on the compared result.

41 Claims, 7 Drawing Sheets

APPARATUS AND METHOD FOR CONTROLLING ON DIE TERMINATION

FIELD OF THE INVENTION

The present invention relates to an apparatus and method for controlling an on die termination (ODT), and more particularly, to an ODT control device for diminishing a clock domain difference between a delay locked loop (DLL) clock and an internal clock.

DESCRIPTION OF RELATED ART

Various semiconductor devices including an integrated circuit (IC) implemented with a plurality of central processing units (CPUs), semiconductor memory devices and gate arrays are combined within electrical products such as a personal computer, a server and a work station. Most semiconductor devices include a receiver for receiving external input signals via input pads, and a transmitter for outputting internal signals externally via output pads.

As operating speeds of the electrical products increase, swing ranges of signals which are interfaced between the semiconductor devices become narrower in order to minimize delay time required for transferring the signals. As the swing ranges of signals become narrower, influence of external noise is increased. As a result, a signal reflection due to an impedance mismatching of an interface terminal is a critical concern. Generally, the impedance mismatching occurs from external noise, source voltage variation, operating temperature variation and manufacturing process variation.

When the impedance mismatching occurs, it is difficult to transfer data with a high rate and data output from the interface terminal of the semiconductor device may be distorted. If impedance of a termination resistor is not matched properly, the transferred signal can be reflected, thereby resulting in a signal transmission failure.

An external fixed resistor presents difficulties in impedance matching due to aging of an integrated circuit, operating temperature variation and manufacturing process variation. Accordingly, when the semiconductor device receives a distorted signal, problems such as setup/hold failure and judgment error of an input level frequently occur.

Recently, technology for adjusting the impedance of the termination resistor has been developed in order to get the same impedance as an external reference impedance by controlling the number of turned-on transistors among a plurality of transistors connected in parallel.

Accordingly, the semiconductor device which requires a high operating speed is implemented with an impedance matching circuit known as an on-chip termination or on-die termination Hereinafter, referring to FIGS. 1A and 1B, a problem of a conventional ODT control method is described in detail.

FIG. 1A is a waveform diagram showing a conventional on die termination (ODT) control method under a low frequency operation, and FIG. 1B is a waveform diagram showing a conventional on die termination (ODT) control method under a high frequency operation.

First, after an ODT command signal ODT_CMD is activated, a delay locked loop (DLL) clock signal DLL_CLK is activated in response to a first rising edge of an external clock signal EXT_CLK (T0), and an ODT enable signal ODTEN is activated in response to the DLL clock signal DLL_CLK.

Then, an ODT circuit operates under the control of an ODT signal ODT activated in response to a second rising edge of the external clock signal EXT_CLK (T1).

In this time, a predetermined time "DLL to ODT on the delay time," which is a delay to substantially operate the ODT circuit after the ODT enable signal ODTEN is activated, is required. The predetermined time "DLL to ODT on the delay time" is fixed regardless of frequency variation of the external clock signal EXT_CLK.

As shown in FIG. 1A, when the external clock signal EXT_CLK operates under the low frequency operation, one clock cycle of the external clock signal EXT_CLK, i.e., from T0 to T1, is longer than the predetermined time "DLL to ODT on the delay time". Accordingly, it is possible to normally operate the ODT circuit at the second rising edge of the external clock signal EXT_CLK (T1).

On the other hand, as shown in FIG. 1B, when the external clock signal EXT_CLK operates under the high frequency operation, the clock cycle of the external clock signal EXT_CLK, i.e., from T0 to T1, is shorter than the predetermined time "DLL to ODT on the delay time". Accordingly, the ODT circuit operates at third or more rising edge, i.e., at T2 or more, not the second rising edge of the external clock signal EXT_CLK (T1). That is, the ODT circuit may operate later than a desired timing.

SUMMARY OF THE INVENTION

It is, therefore, an object of the present invention to provide a method for controlling an on die termination (ODT) and control circuit capable of performing an ODT operation at a desired timing by diminishing a clock domain difference between a delay locked loop (DLL) clock and an internal clock regardless of an operating frequency of an ODT circuit.

In accordance with an aspect of the present invention, there is provided an apparatus for controlling an on die termination (ODT), including: a counting unit for receiving an external clock signal and a delay locked loop (DLL) clock signal, and counting the toggle number of each of external clock signal and the DLL clock signal from a preset number; a comparing control unit for comparing the counted toggle number of the external clock signal with that of the DLL clock signal in response to an ODT command signal, and outputting an ODT enable signal for controlling the ODT based on the compared result.

In accordance with another aspect of the present invention, there is provided a method for controlling an on die termination (ODT), including: a reset step of activating a first reset signal in response to an external reset signal, and, after a predetermined time, activating a second reset signal; a DLL clock counting step of counting the toggle number of a DLL clock signal from a preset value in response to the first reset signal, and outputting the counted toggle number as a DLL code; an external clock counting step of counting the toggle number of an external clock signal from a preset value in response to the second reset signal, and outputting the counted toggle number as an external code; and a comparing step of determining a logic level of an ODT enable signal by comparing the external code with the DLL code in response to an ODT command signal to generate an ODT enable signal whose logic level is determined based on the compared result.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE INVENTION

Hereinafter, a method for controlling an on die termination (ODT) and control circuit in accordance with the present invention will be described in detail referring to the accompanying drawings.

Figure 1A:
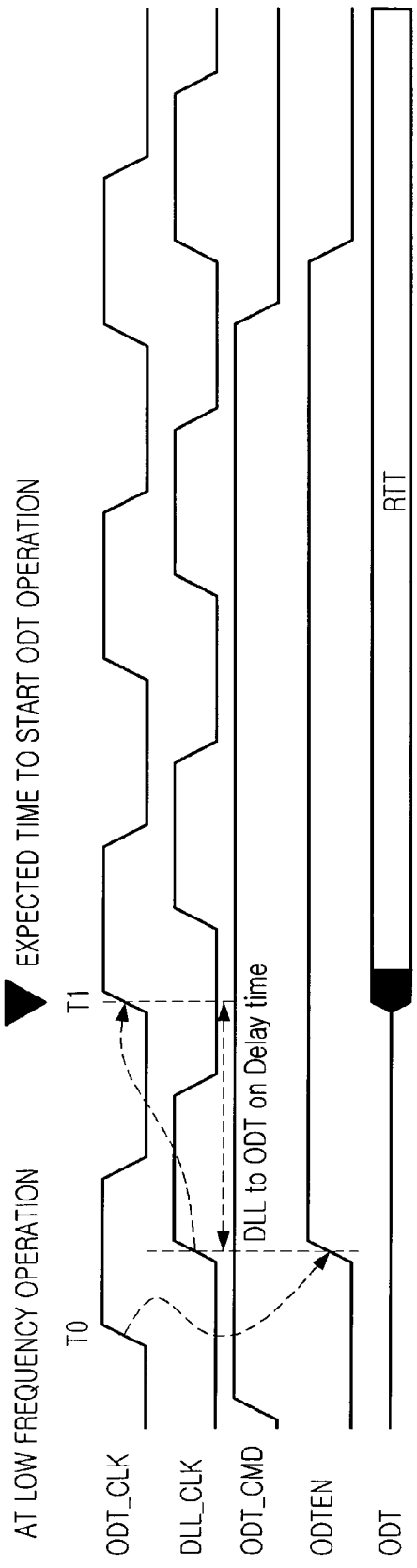
FIG. 1A is a waveform diagram showing a conventional on die termination (ODT) control method under a low frequency operation.
Figure 1B:
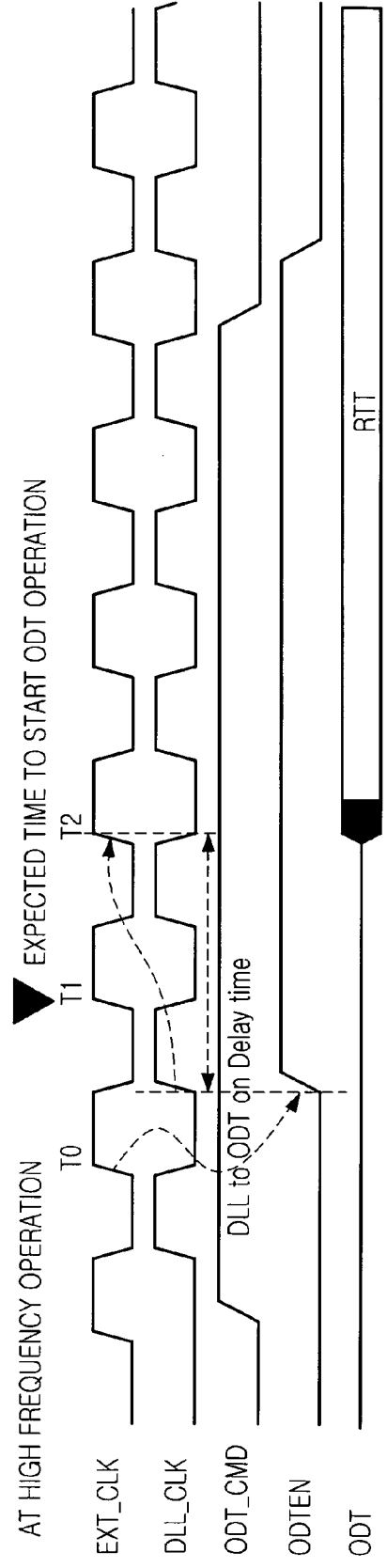
FIG. 1B is a waveform diagram showing a conventional ODT control method under a high frequency operation.
Figure 2:
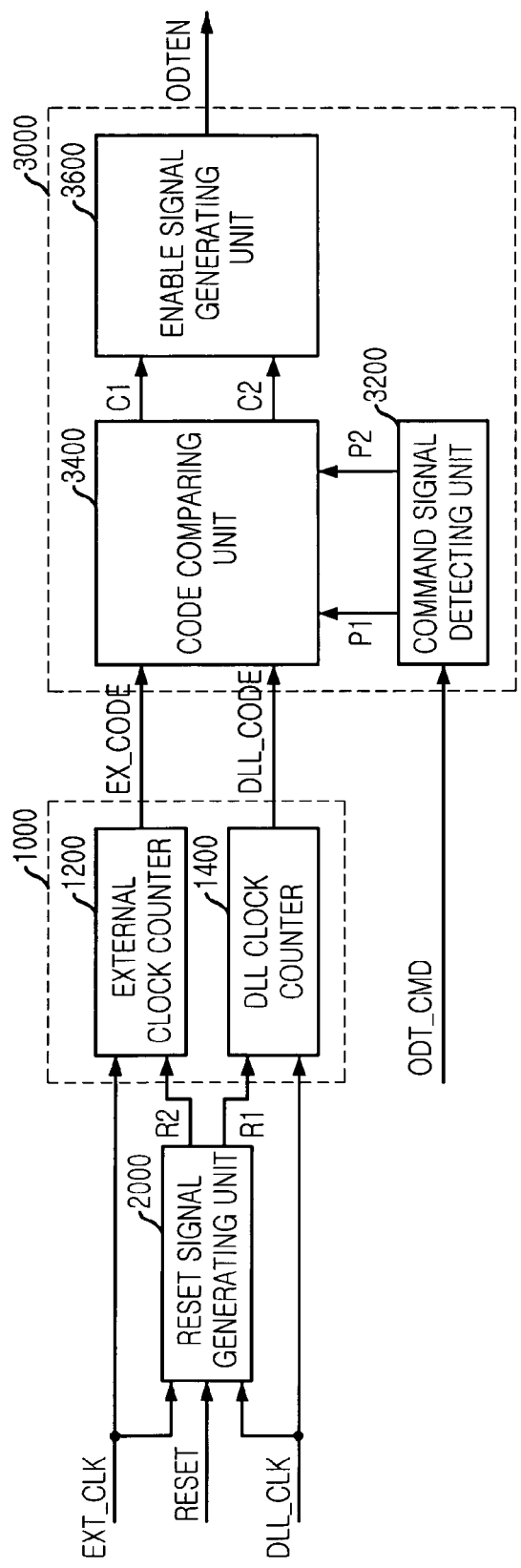
FIG. 2 is a block diagram of an ODT control circuit in accordance with an embodiment of the present invention.

FIG. 2 is a block diagram of an on die termination (ODT) control circuit in accordance with an embodiment of the present invention.

The ODT control circuit includes a counting unit 1000, a reset signal generating unit 2000, and a comparing control unit 3000. The counting unit 1000 receives an external clock signal EXT_CLK and a delay locked loop (DLL) clock signal DLL_CLK, and counts a toggle number of each clock from a preset value. The reset signal generating unit 2000 outputs a first reset signal R1 for initializing the toggle number of the DLL clock signal DLL_CLK in response to an external reset signal RESET, and outputs a second reset signal R2 for initializing the toggle number of the external clock signal EXT_CLK after a predetermined time. The comparing control unit 3000 compares the toggle number of the external clock signal EXT_CLK with that of the DLL clock signal DLL_CLK in response to an ODT command signal ODT_CMD to thereby output an ODT enable signal ODTEN for controlling an operation of an ODT circuit based on the compared result.

The counting unit 100Q includes an external clock counter 1200, and a DLL clock counter 1400. The external clock counter 1200 starts counting the toggle number of the external clock signal EXT_CLK in response to the second reset signal R2, and outputs the toggle number as an external code EX_CODE. The DLL clock counter 1400 starts counting the toggle number of the DLL clock signal DLL_CLK in response to the first reset signal R1, and outputs the toggle number as a DLL code DLL_CODE.

The comparing control unit 3000 includes a command signal detecting unit 3200, a code comparing unit 3400, and an enable signal generating unit 3600. The command signal detecting unit 3200 detects a variation of edges of the ODT command signal ODT_CMD to output first and second detection signals P1 and P2. The code comparing unit 3400 compares the external code EX_CODE with the DLL code DLL_CODE in response to the first and second detection signals P1 and P2, and outputs first and second comparing signals C1 and C2 based on the compared result. The enable signal generating unit 3600 determines a logic level of the ODT enable signal ODTEN in response to the first and second comparing signals C1 and C2.

Figure 3:
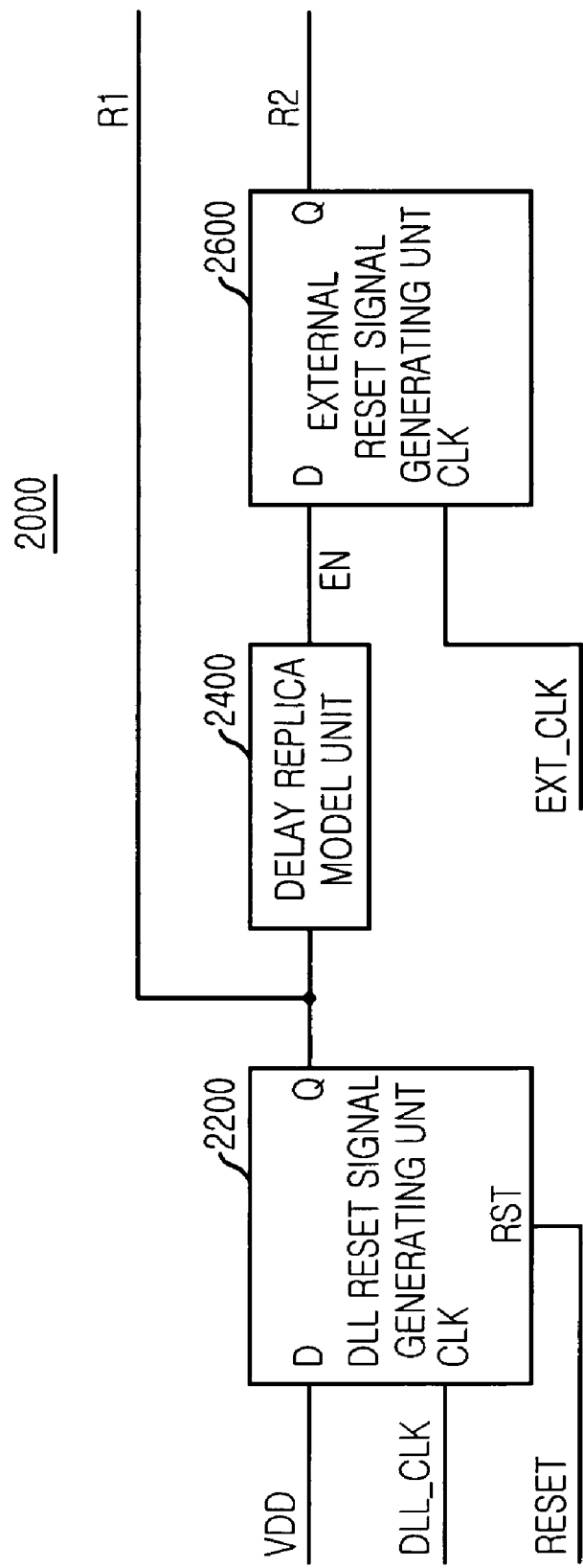
FIG. 3 is a circuit diagram of a reset signal generating unit of the ODT control circuit shown in FIG. 2.

FIG. 3 is a circuit diagram of the reset signal generating unit 2000 of the ODT control circuit shown in FIG. 2.

The reset signal generating unit 2000 includes a DLL reset signal generating unit 2200, a delay replica model unit 2400, and an external reset signal generating unit 2600. The DLL reset signal generating unit 2200 generates the first reset signal R1 by synchronizing a source voltage VDD with the DLL clock signal DLL_CLK in response to the external reset signal RESET. The delay replica model unit 2400 determines a predetermined time by modeling a delay time between the DLL clock signal DLL_CLK and the external clock signal EXT_CLK, and delays the first reset signal R1 by the predetermined time to output a delay reset signal EN. The external reset signal generating unit 2600 generates the second reset signal R2 by synchronizing the delay reset signal EN with the external clock signal EXT_CLK.

The DLL reset signal generating unit 2200 includes a D-flip-flop which receives the source voltage VDD as a data input D, the DLL clock signal DLL_CLK as a clock input CLK, and the external reset signal RESET as a reset input RST, determines a logic level of the first reset signal R1, and outputs the first reset signal R1.

Likewise, the external reset signal generating unit 2600 includes a D-flip-flop which receives the delay reset signal EN as a data input D, and the external clock signal EXT_CLK as a clock input CLK, determines a logic level of the second reset signal R2, and outputs the second reset signal R2.

Figure 4:
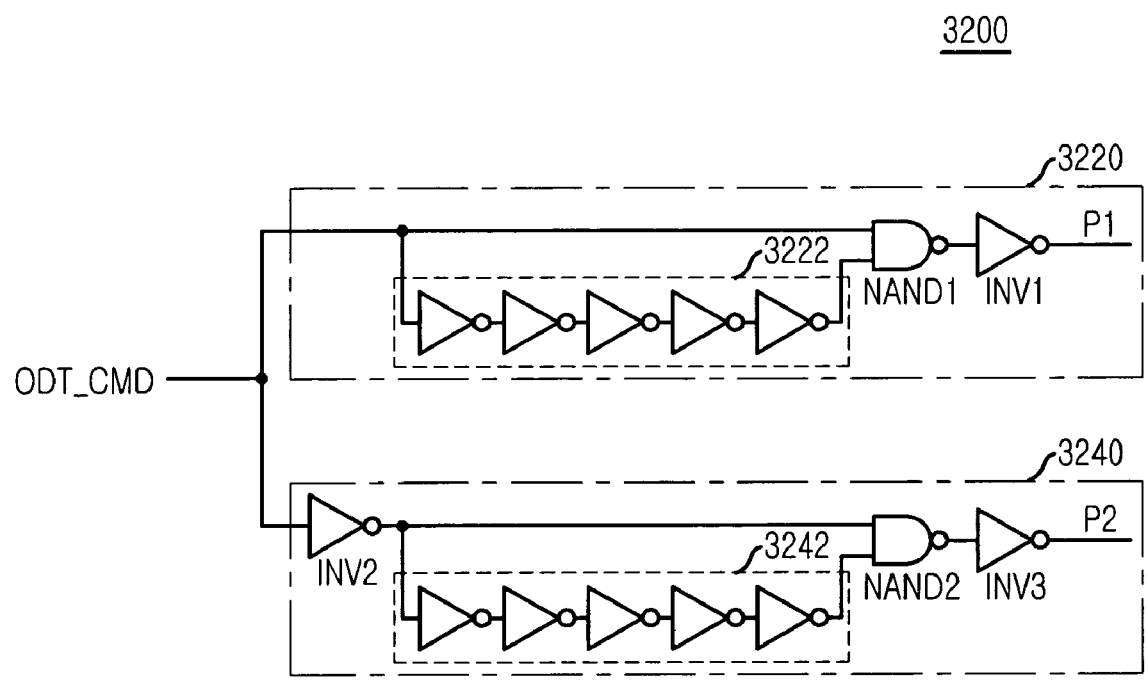
FIG. 4 is a circuit diagram of a command signal detecting unit of a comparing control unit shown in FIG. 2.

FIG. 4 is a circuit diagram of the command signal detecting unit 3200 of the comparing control unit 3000 shown in FIG. 2.

The command signal detecting unit 3200 includes a rising edge detection unit 3220 and a falling edge detection unit 3240. The rising edge detection unit 3220 detects a rising edge of the ODT command signal ODT_CMD to toggle the first detection signal P1. The falling edge detection unit 3240 detects a falling edge of an inverted ODT command signal to toggle the second detection signal P2.

The rising edge detection unit 3220 includes a first delay unit 3222, a first NAND gate NAND1, and a first inverter INV1. The first delay unit 3222 delays the ODT command signal ODT_CMD by one clock cycle of the external clock signal EXT_CLK. The first NAND gate NAND1 performs a NAND operation of the ODT command signal ODT_CMD and an output signal of the first delay unit 3222. The first inverter INV1 inverts an output signal of the first NAND gate NAND1 to output the first detection signal P1.

The falling edge detection unit 3240 includes second and third inverters INV2 and INV3, a second delay unit 3242, and a second NAND gate NAND2. The second inverter INV2 inverts the ODT command signal ODT_CMD. The second delay unit 3242 delays an output signal of the second inverter INV2 by one clock cycle of the external clock signal EXT_CLK. The second NAND gate NAND2 performs a NAND operation of the ODT command signal ODT_CMD and an output signal of the second delay unit 3242. The third inverter INV3 inverts an output signal of the second NAND gate NAND2 to output the second detection signal P2.

The above-mentioned first and second delay units 3222 and 3242 may include a plurality of inverters connected in series, thereby inverting and outputting received signals.

Figure 5:
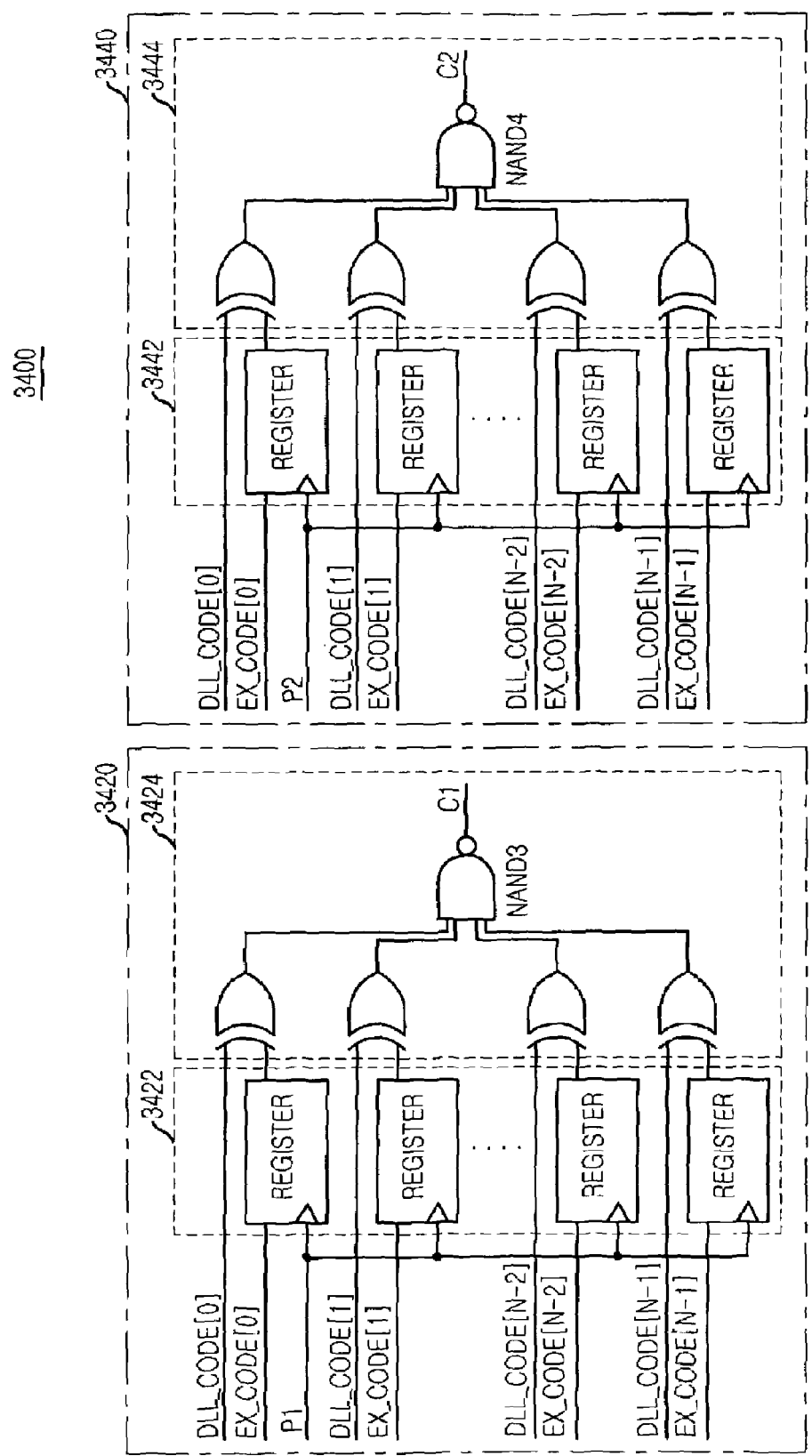
FIG. 5 is a circuit diagram of a code comparing unit of the comparing control unit shown in FIG. 2.

FIG. 5 is a circuit diagram of the code comparing unit 3400 of the comparing control unit 3000 shown in FIG. 2.

The code comparing unit 3400 includes first and second comparing units 3420 and 3440. The first comparing unit 3420 compares the external code EX_CODE with the DLL code DLL_CODE based on the first detection signal P1 and determines whether the first comparing signal C1 is toggled or not. The second comparing unit 3440 compares the external code EX_CODE with the DLL code DLL_CODE based on the second detection signal P2 and determines whether the second comparing signal C2 is toggled or not.

Hereinafter, referring to FIG. 5, an operation of the code comparing unit 3400 is explained in detail.

First, the first comparing unit 3420 of the code comparing unit 3400 starts comparing the external code EX_CODE with the DLL code DLL_CODE when the first detection signal P1 is transited, and toggles the first comparing signal C1 when the external code EX_CODE is substantially the same as the DLL code DLL_CODE.

Second, the second comparing unit 3440 of the code comparing unit 3400 starts comparing the external code EX_CODE with the DLL code DLL_CODE when the second detection signal P2 is transited, and toggles the second comparing signal C2 when the external code EX_CODE is substantially the same as the DLL code DLL_CODE.

That is, the code comparing unit 3400 toggles the first comparing signal C1 at the rising edge of the ODT command signal ODT_CMD, and toggles the second comparing signal C2 at the falling edge of the ODT command signal ODT_CMD.

In detail, the first comparing unit 3420 includes a first storage unit 3422 and a first logic unit 3424. The first storage unit 3422 stores the external code EX_CODE in response to the first detection signal P1. The first logic unit 3424 compares the stored code in the first storage unit 3422 with the DLL code DLL_CODE and determines whether the first comparing signal C1 is toggled or not.

The first storage unit 3422 includes a plurality of first registers capable of storing one bit, thereby sequentially saving the external code EX_CODE by one bit unit.

The first logic unit 3424 includes a plurality of first exclusive OR (XOR) gates and a third NAND gate NAND3. Each first XOR gate performs an XOR operation of a corresponding one bit of the DLL code DLL_CODE and one bit saved in a corresponding one of the plurality of first registers. The third NAND gate NAND3 performs a NAND operation of output signals of the plurality of first XOR gates and outputs the first comparing signal C1.

The second comparing unit 3440 includes a second storage unit 3442 and a second logic unit 3444. The second storage unit 3442 stores the external code EX_CODE in response to the second detection signal P2. The second logic unit 3444 compares the stored code in the second storage unit 3442 with the DLL code DLL_CODE and determines whether the second comparing signal C2 is toggled or not.

The second storage unit 3442 includes a plurality of second registers capable of storing one bit, thereby sequentially saving the external code EX_CODE by one bit unit.

The second logic unit 3444 includes a plurality of second exclusive OR (XOR) gates and a fourth NAND gate NAND4. Each second XOR gate performs an XOR operation of a corresponding one bit of the DLL code DLL_CODE and one bit saved in a corresponding one of the plurality of second registers. The fourth NAND gate NAND4 performs a NAND operation of output signals of the plurality of second XOR gates and outputs the second comparing signal C2.

Figure 6:
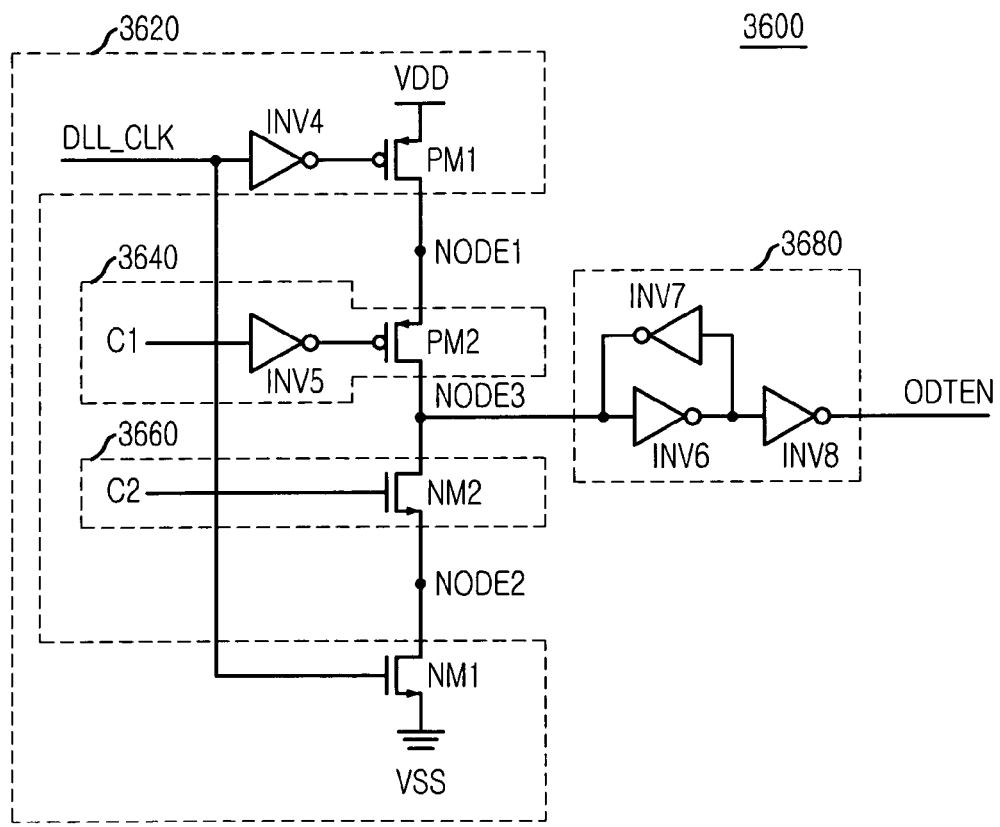
FIG. 6 is a circuit diagram of an enable signal generating unit of the comparing control unit shown in FIG. 2.

FIG. 6 is a circuit diagram of the enable signal generating unit 3600 of the comparing control unit 3000 shown in FIG. 2.

The enable signal generating unit 3600 includes a synchronizing unit 3620, a rising driving unit 3640, a falling driving unit 3660, and a latch unit 3680. The synchronizing unit 3620 synchronizes the ODT enable signal ODTEN with the DLL clock signal DLL_CLK. The rising driving unit 3640 outputs the source voltage VDD as the ODT enable signal ODTEN in response to the first comparing signal C1. The falling driving unit 3660 outputs a ground voltage VSS as the ODT enable signal ODTEN in response to the second comparing signal C2. The latch unit 3680 prevents the ODT enable signal ODTEN from floating.

In detail, the synchronizing unit 3620 includes a fourth inverter INV4, a first PMOS transistor PM1, and a first NMOS transistor NM1. The fourth inverter INV4 inverts the DLL clock signal DLL_CLK to output an inverted DLL clock signal. The first PMOS transistor PM1 has a gate receiving the inverted DLL clock signal and a source-drain path between the source voltage (VDD) terminal and a first node NODE1. The first NMOS transistor NM1 has a gate receiving the DLL clock signal DLL_CLK and a source-drain path between the ground voltage (VSS) terminal and a second node NODE2. Accordingly, the above-mentioned synchronizing unit 3620 turns on the first PMOS transistor PM1 and the first NMOS transistor NM1 when the ODT enable signal ODT_EN is activated with a logic level 'HIGH' from 'LOW'; and turns off them when the ODT enable signal ODT_EN is inactivated with a logic level 'LOW to 'HIGH'.

The rising driving unit 3640 includes a fifth inverter INV5 and a second PMOS transistor PM2. The fifth inverter INV5 inverts the first comparing signal C1. The second PMOS transistor PM2 has a gate receiving an output signal of the fifth inverter INV5 and a source-drain path between the first node NODE1 and a third node NODE3. Accordingly, the above-mentioned rising driving unit 3640 activates the ODT enable signal ODTEN with a logic level 'HIGH' in response to the first comparing signal C1.

The falling driving unit 3660 includes a second NMOS transistor NM2. The second NMOS transistor NM2 has a gate receiving the second comparing signal C2 and a source-drain path between the second node NODE2 and the third node NODE3. Accordingly, the above-mentioned falling driving unit 3660 inactivates the ODT enable signal ODTEN with a logic level 'LOW' in response to the second comparing signal C2.

The latch unit 3680 includes an inverter latch having sixth and seventh inverters INV6 and INV7, and an eighth inverter INV8. The sixth inverter INV6 inverts a signal at the third node NODE3, and the seventh inverter INV7 receives and inverts an output signal of the sixth inverter INV6 to output the inverted signal to the sixth inverter INV6. The eighth inverter INV8 inverts the output signal of the sixth inverter INV6 to output the ODT enable signal ODTEN.

As described above, the ODT enable signal ODTEN is activated when the first comparing signal C1 is toggled; and inactivated when the second comparing signal C2 is toggled. That is, the embodiment of the present invention determines activation timing of the ODT enable signal ODTEN based on the toggle numbers of the external clock signal EXT_CLK and the DLL clock signal DLL_CLK. Therefore, it is possible to prevent the ODT enable signal ODTEN from being activated at undesired timing even if the external clock signal EXT_CLK and the DLL clock signal DLL_CLK operate under a high frequency. Further, a user may set the activation timing of the ODT enable signal ODTEN after the ODT command signal ODT_CMD is activated based on an initial setting.

Figure 7:
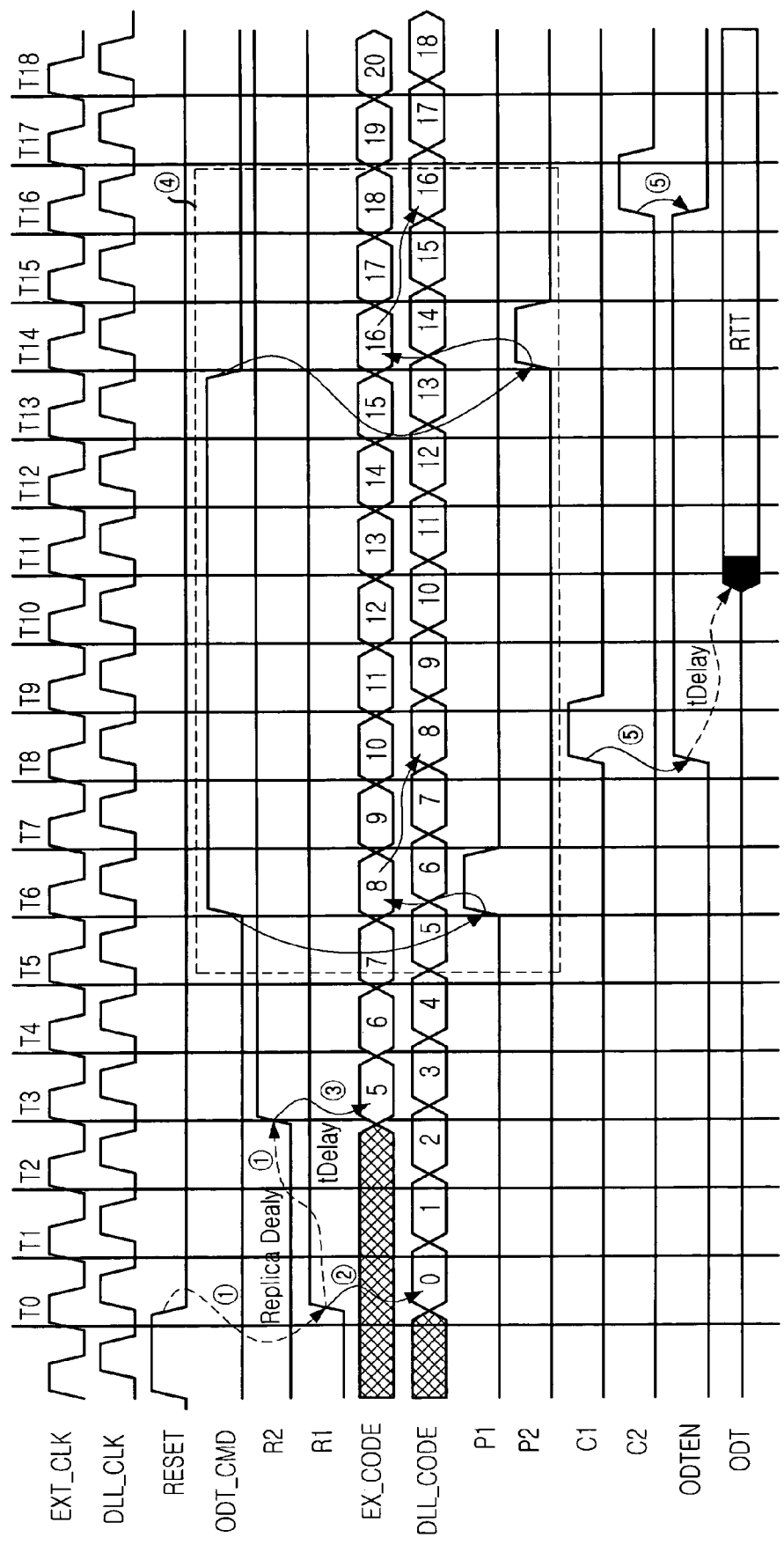
FIG. 7 is a waveform diagram showing an ODT control method in accordance with the present invention.

FIG. 7 is a waveform diagram showing an ODT control method in accordance with the present invention.

First, in a reset step, the DLL reset signal generating unit 2200 activates the first reset signal R1 in response to the external reset signal RESET, and external reset signal generating unit 2600 activates the second reset signal R2 after the predetermined time determined by modeling a delay time between the DLL clock signal DLL_CLK and the external clock signal EXT_CLK (see ①).

Second, in a DLL clock counting step, the DLL clock counter 1400 starts counting the toggle number of the DLL clock signal DLL_CLK from a preset value, i.e., 0, in response to the first reset signal R1, and outputs the toggle number as the DLL code DLL_CODE (see ②).

Third, in an external clock counting step, the external clock counter 1200 starts counting the toggle number of the external clock signal EXT_CLK from a preset value, i.e., 5, in response to the second reset signal R2, and outputs the toggle number as the external code EX_CODE (see ③).

Fourth, in a comparing step, the code comparing unit 3400 compares the external code EX_CODE with the DLL code DLL_CODE in response to the ODT command signal ODT_CMD (see ④), and the enable signal generating unit 3600 determines a logic level of the ODT enable signal ODTEN in response to the comparing result (see ⑤).

In detail, the code comparing unit 3400 stores the external code EX_CODE at the registers when the ODT command signal ODT_CMD is transited, and then toggles the ODT enable signal ODTEN when the storing code is substantially the same as the DLL code DLL_CODE.

In the comparing step, the ODT enable signal ODTEN is transited to a logic level 'HIGH' in synchronization with the rising edge of the ODT command signal ODT_CMD, and transited to a logic level 'LOW' in synchronization with the falling edge of the ODT command signal ODT_CMD.

As described above, the on die termination (ODT) control device of the present invention determines activation timing of the ODT enable signal based on the toggle numbers of the external clock signal and the DLL clock signal. Therefore, it is possible to prevent the ODT enable signal from being activated at undesired timing even if the external clock signal and the DLL clock signal operate under a high frequency. Further, user may set the activation timing of the ODT enable signal after the ODT command signal is activated based on an initial setting.

The present application contains subject matter related to Korean patent application Nos. 2005-90953 & 2006-49027, filed in the Korean Patent Office on Sep. 29, 2005 & May 30, 2006, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. An apparatus for controlling an on die termination (ODT), the apparatus comprising:
    a counting unit for receiving an external clock signal and a delay locked loop (DLL) clock signal, and counting the toggle number of each of external clock signal and the DLL clock signal from a preset number;
    a comparing control unit for comparing the counted toggle number of the external clock signal with that of the DLL clock signal in response to an ODT command signal, and outputting an ODT enable signal for controlling the ODT based on the compared result.

2. The apparatus as recited in claim 1, further comprising:
    a reset signal generating unit for outputting a first reset signal initializing the toggle number of the DLL clock signal in response to an external reset signal, and, after a predetermined time, outputting a second reset signal initializing the toggle number of the external clock signal.

3. The apparatus as recited in claim 2, wherein the reset signal generating unit generates the first reset signal by synchronizing a source voltage with the DLL clock signal in response to the external reset signal.

4. The apparatus as recited in claim 2, wherein the reset signal generating unit generates the second reset signal by synchronizing a signal generated by delaying the first reset signal delayed for the predetermined time with the external clock signal.

5. The apparatus as recited in claim 2, wherein the reset signal generating unit includes:
    a DLL reset signal generating unit for generating the first reset signal by synchronizing a source voltage with the DLL clock signal in response to the external reset signal;
    a delay replica model unit for delaying the first reset signal by the predetermined time and outputting a delayed reset signal; and
    an external reset signal generating unit for generating the second reset signal by synchronizing the delayed reset signal with the external clock signal.

6. The apparatus as recited in claim 5, wherein the DLL reset signal generating unit includes a D-flip-flop which receives the source voltage as a data input, the DLL clock signal as a clock input, and the external reset signal as a reset input, and determines a logic level of the first reset signal.

7. The apparatus as recited in claim 5, wherein the delay replica model unit determines the predetermined time by modeling a delay time between the DLL clock signal and the external clock signal.

8. The apparatus as recited in claim 5, wherein the external reset signal generating unit includes a D-flip-flop which receives the delayed reset signal as a data input, and the external clock signal as a clock input, and determines a logic level of the second reset signal.

9. The apparatus as recited in claim 2, wherein the counting unit includes:
    a DLL clock counter for counting the toggle number of the DLL clock signal in response to the first reset signal, and outputting the counted toggle number as a DLL code; and
    an external clock counter for counting the toggle number of the external clock signal in response to the second reset signal, and outputting the counted toggle number as an external code.

10. The apparatus as recited in claim 9, wherein the comparing control unit includes:
    a command signal detecting unit for outputting first and second detection signals by detecting transition of the ODT command signal;

a code comparing unit for outputting first and second comparing signals by comparing the external code with the DLL code in response to the first and second detection signals; and an enable signal generating unit for determining a logic level of the ODT enable signal in response to the first and second comparing signals.

11. The apparatus as recited in claim 10, wherein the command signal detecting unit toggles the first detection signal by detecting a rising edge of the ODT command signal.

12. The apparatus as recited in claim 10, wherein the command signal detecting unit toggles the second detection signal by detecting a falling edge of the ODT command signal.

13. The apparatus as recited in claim 10, wherein the command signal detecting unit includes:

a rising edge detection unit for detecting a rising edge of the ODT command signal to toggle the first detection signal; and a falling edge detection unit for detecting a falling edge of the ODT command signal to toggle the second detection signal.

14. The apparatus as recited in claim 13, wherein the rising edge detection unit includes:

a delay unit for delaying the ODT command signal by a preset time;

a logic gate for performing a NAND operation of the ODT command signal and an output signal of the delay unit; and an inverter for inverting an output signal of the NAND gate to output the first detection signal.

15. The apparatus as recited in claim 14, wherein the delay unit delays the ODT command signal by one clock cycle of the external clock signal.

16. The apparatus as recited in claim 14, wherein the delay unit includes a plurality of inverters connected in series to invert the ODT command signal.

17. The apparatus as recited in claim 13, wherein the falling edge detection unit includes:

a first inverter for inverting the ODT command signal;

a delay unit for delaying an output signal of the first inverter by a preset time;

a logic gate for performing a NAND operation of the output signal of the first inverter and an output signal of the delay unit; and a second inverter for inverting an output signal of the NAND gate to output the second detection signal.

18. The apparatus as recited in claim 17, wherein the delay unit delays the output signal of the first inverter by one clock cycle of the external clock signal.

19. The apparatus as recited in claim 17, wherein the delay unit includes a plurality of inverters connected in series to invert the output signal of the first inverter.

20. The apparatus as recited in claim 13, wherein the code comparing unit toggles the first comparing signal in response to the first detection signal when the external code is substantially the same as the DLL code.

21. The apparatus as recited in claim 13, wherein the code comparing unit toggles the second comparing signal in response to the second detection signal when the external code is substantially the same as the DLL code.

22. The apparatus as recited in claim 13, wherein the code comparing unit includes:

a first comparing unit for comparing the external code with the DLL code and determines whether the first comparing signal is toggled or not based on the first detection signal; and a second comparing unit for comparing the external code with the DLL code and determines whether the second comparing signal is toggled or not based on the second detection signal.

23. The apparatus as recited in claim 22, wherein the first comparing unit includes:

a storage unit for storing the external code in response to the first detection signal; and a logic unit for comparing the stored code in the storage unit with the DLL code to determine whether the first comparing signal is toggled or not.

24. The apparatus as recited in claim 23, wherein the storage unit includes a plurality of registers each of which is capable of storing one bit, thereby sequentially saving the external code by one bit unit.

25. The apparatus as recited in claim 24, wherein the logic unit includes:

a plurality of exclusive OR (XOR) gates, each for performing an XOR operation of each bit of the DLL code and a corresponding bit of the external code stored in a corresponding one of the plurality of registers; and a logic gate for performing a NAND operation of output signals of the plurality of XOR gates and outputting the first comparing signal.

26. The apparatus as recited in claim 22, wherein the second comparing unit includes:

a storage unit for storing the external code in response to the second detection signal; and a logic unit for comparing the stored code in the storage unit with the DLL code to determine whether the second comparing signal is toggled or not.

27. The apparatus as recited in claim 26, wherein the storage unit includes a plurality of registers each of which is capable of storing one bit, thereby sequentially saving the external code by one bit unit.

28. The apparatus as recited in claim 27, wherein the logic unit includes:

a plurality of exclusive OR (XOR) gates, each for performing an XOR operation of each bit of the DLL code and a corresponding bit of the external code stored in a corresponding one of the plurality of registers; and a logic gate for performing a NAND operation of output signals of the plurality of XOR gates and outputting the second comparing signal.

29. The apparatus as recited in claim 22, wherein the enable signal generating unit activates the ODT enable signal with a logic high level in response to the first comparing signal.

30. The apparatus as recited in claim 22, wherein the enable signal generating unit inactivates the ODT enable signal with a logic low level in response to the second comparing signal.

31. The apparatus as recited in claim 22, wherein the enable signal generating unit transits the ODT enable signal in response to the DLL clock signal.

32. The apparatus as recited in claim 22, wherein the enable signal generating unit includes:

a rising driving unit for outputting a source voltage as the ODT enable signal in response to the first comparing signal;

a falling driving unit for outputting a ground voltage as the ODT enable signal in response to the second comparing signal;

a synchronizing unit for synchronizing the ODT enable signal with the DLL clock signal; and a latch unit for latching the ODT enable signal.

33. The apparatus as recited in claim 32, wherein the synchronizing unit includes:

a first inverter for inverting the DLL clock signal to output an inverted DLL clock signal;

a first PMOS transistor having a gate receiving the inverted DLL clock signal and a source-drain path between the source voltage terminal and a first node; and a first NMOS transistor having a gate receiving the DLL clock signal and a source-drain path between a second node and the ground voltage terminal, wherein the synchronizing unit is coupled with the rising and the falling driving units through the first and second node, respectively.

34. The apparatus as recited in claim 33, wherein the rising driving unit includes:

a second inverter for inverting the first comparing signal; and a second PMOS transistor having a gate receiving an output signal of the second inverter and a source-drain path between the first node and a third node, wherein the third node is connected to the falling driving unit.

35. The apparatus as recited in claim 33, wherein the falling driving unit includes a second NMOS transistor having a gate receiving the second comparing signal and a source-drain path between the second node and the third node.

36. The apparatus as recited in claim 33, wherein the latch unit includes:

an inverter latch having a second inverter for inverting a signal at the third node and a third inverter for inverting an output signal of the second inverter to output the inverted signal to the second inverter; and fourth inverter for inverting the output signal of the second inverter to output the ODT enable signal.

37. A method for controlling an on die termination (ODT), the method comprising:

a reset step of activating a first reset signal in response to an external reset signal, and, after a predetermined time, activating a second reset signal;

a DLL clock counting step of counting the toggle number of a DLL clock signal from a preset value in response to the first reset signal, and outputting the counted toggle number as a DLL code;

an external clock counting step of counting the toggle number of an external clock signal from a preset value in response to the second reset signal, and outputting the counted toggle number as an external code; and a comparing step of determining a logic level of an ODT enable signal by comparing the external code with the DLL code in response to an ODT command signal to generate an ODT enable signal whose logic level is determined based on the compared result.

38. The method as recited in claim 37, wherein, in the reset step, the predetermined time is set by modeling a delay time between the DLL clock signal and the external clock signal.

39. The method as recited in claim 37, wherein, in the comparing step, the external code is stored at a plurality of registers when the ODT command signal is transited, and the ODT enable signal is transited when the stored external code is substantially the same as the DLL code.

40. The method as recited in claim 37, wherein, in the comparing step, the ODT enable signal is transited to an enable state in synchronization with a rising edge of the ODT command signal.

41. The method as recited in claim 37, wherein, in the comparing step, the ODT enable signal is transited to a disable state in synchronization with a falling edge of the ODT command signal.

* * * * *